United States Patent
Vo et al.

(10) Patent No.: US 10,472,482 B2
(45) Date of Patent: Nov. 12, 2019

(54) THERMALLY INSULATING FOAM WITH VERTICALLY ELONGATED CELLS

(71) Applicant: Dow Global Technologies LLC, Midland, MI (US)

(72) Inventors: Van-Chau Vo, Wollerau (CH); David J. Frankowski, Freeland, MI (US); Anson Wong, Midland, MI (US); Stéphane Costeux, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 283 days.

(21) Appl. No.: 15/552,192

(22) PCT Filed: Apr. 7, 2016

(86) PCT No.: PCT/US2016/026316
§ 371 (c)(1),
(2) Date: Nov. 28, 2017

(87) PCT Pub. No.: WO2016/168041
PCT Pub. Date: Oct. 20, 2016

(65) Prior Publication Data
US 2018/0215890 A1    Aug. 2, 2018

Related U.S. Application Data

(60) Provisional application No. 62/147,838, filed on Apr. 15, 2015.

(51) Int. Cl.
*B29C 44/34* (2006.01)
*B29C 44/50* (2006.01)
(Continued)

(52) U.S. Cl.
CPC .............. *C08J 9/149* (2013.01); *B29C 44/352* (2013.01); *B29C 44/50* (2013.01); *C08J 9/0061* (2013.01);
(Continued)

(58) Field of Classification Search
CPC ...................................... B29C 44/352
See application file for complete search history.

(56) References Cited

U.S. PATENT DOCUMENTS 6,034,143 A    3/2000   Morioka et al.
6,315,932 B1 * 11/2001  Fujiwara ................. C08J 9/149
                                                      264/288.8
(Continued)

FOREIGN PATENT DOCUMENTS

EP    561216      1/1999
EP    2327697     7/2012
(Continued)

*Primary Examiner* — Michael M Dollinger
*Assistant Examiner* — Christina H. W. Rosebach (57) ABSTRACT

An extruded polymer foam has a polymer matrix with styrene-acrylonitrile copolymer and infrared attenuator and cell having an average size in the foam vertical direction of 150 micrometers or less, a ratio of vertical cell size to extrusion direction cell size that is greater than one and a cell anisotropic ratio that is greater than 1.1; the foam having a P-Ratio of 0.7 or less, less than 0.2 moles of hydrocarbon blowing agent in the cells per kilogram of foam; a density of 20-48 kilograms per cubic meter and a 25-year thermal conductivity that is 0.030 Waters per meter-Kelvin or less when free of fluorinated blowing agents and less than 0.029 Watts per meter-Kelvin when containing fluorinated blowing agent.

10 Claims, 2 Drawing Sheets

(51) Int. Cl.

| | |
|---|---|
| *C08J 9/14* | (2006.01) |
| *C08J 9/00* | (2006.01) |
| *C08K 3/04* | (2006.01) |
| *C08J 9/12* | (2006.01) |
| *B29K 507/04* | (2006.01) |
| *B29K 105/04* | (2006.01) |
| *B29K 25/00* | (2006.01) |

(52) U.S. Cl.
CPC .............. *C08J 9/0066* (2013.01); *C08J 9/122* (2013.01); *C08J 9/125* (2013.01); *C08J 9/141* (2013.01); *C08J 9/142* (2013.01); *C08J 9/146* (2013.01); *C08K 3/04* (2013.01); *C08K 3/042* (2017.05); *B29K 2025/08* (2013.01); *B29K 2105/046* (2013.01); *B29K 2507/04* (2013.01); *B29K 2995/0015* (2013.01); *B29K 2995/0063* (2013.01); *C08J 2201/022* (2013.01); *C08J 2201/03* (2013.01); *C08J 2203/06* (2013.01); *C08J 2203/10* (2013.01); *C08J 2203/12* (2013.01); *C08J 2203/14* (2013.01); *C08J 2203/144* (2013.01); *C08J 2203/164* (2013.01); *C08J 2203/202* (2013.01); *C08J 2205/044* (2013.01); *C08J 2205/052* (2013.01); *C08J 2205/10* (2013.01); *C08J 2325/12* (2013.01); *C08J 2425/12* (2013.01)

(56) References Cited

U.S. PATENT DOCUMENTS

| | | | |
|---|---|---|---|
| 6,841,581 | B2 | 1/2005 | Hayashi et al. |
| 7,919,538 | B2 * | 4/2011 | Vo .......................... C08J 9/0066 264/53 |
| 8,557,884 | B2 | 10/2013 | Miller et al. |
| 8,568,632 | B2 | 10/2013 | Ryng et al. |
| 2007/0142487 | A1 * | 6/2007 | Miller ................ B29C 44/3403 521/142 |

FOREIGN PATENT DOCUMENTS

| | | | |
|---|---|---|---|
| WO | 2001018098 | 3/2001 | |
| WO | WO-0118098 A1 * | 3/2001 | .............. C08J 9/127 |

* cited by examiner

THERMALLY INSULATING FOAM WITH VERTICALLY ELONGATED CELLS

BACKGROUND OF THE INVENTION

Field of the Invention

The present invention relates to thermally insulating extruded thermoplastic polymer foam and a method for preparing such foam.

Introduction

Extruded polystyrene (XPS) foam is useful as thermal insulation. XPS foam has long been used as thermal insulation in building structures and containers. With an ever increasing drive for energy efficiency, there is an ever increasing drive to increase the thermal insulating properties of insulating products such as XPS foam. Therefore, it is desirable to identify how to decrease thermal conductivity through XPS foam.

Incorporating infrared attenuating agents such as carbon black and graphite into polymeric foam has been one approach for decreasing thermal conductivity through polymer foam. See, for example, U.S. Pat. No. 7,919,538B2. Conceptually, the infrared attenuating agents are dispersed within the cell walls of foam and absorb infrared radiation that is trying to pass through the foam. However, it is desirable to achieve even greater reduction in thermal conductivity through polymer foam than is achieved merely by including infrared attenuating agent in polymer foam as reported in U.S. Pat. No. 7,919,538.

Introduction of cell size anisotropy has also been an approach to minimizing thermal conductivity through polymer foam. As the following references indicate, the general consensus is that stretching foam in its extrusion direction so as to shorten the cell dimension in the vertical direction relative to dimensions perpendicular to the vertical direction of the foam increases thermal insulating properties (decreases thermal conductivity properties) through the foam.

U.S. Pat. No. 6,841,581 (Hayashi) refers to a cell anisotropic ratio k and specifies that when k exceeds 1.1 the thermal insulating property of foam decreases, making it difficult to obtain a short-term (30 day after production) thermal conductivity of 0.028 Watts per meter*Kelvin (W/m*K). The cell anisotropic ratio is defined as follows:

$$k=a/(a*b*c)^{1/3}$$

where a is the average cell size in the vertical direction, b is the average cell size in the transverse (horizontal) direction and c is the average cell size in the longitudinal (extrusion) direction.

EP1511795B1 and US2007/0142487 both teach that reducing the cell anisotropic ratio of foam increases the thermal insulation (reduces thermal conductivity) properties of the foam. EP1511795B1 and US2007/0142487 teach increased insulation is obtained with foam having a value for x/z (which corresponds to c/a in the above notation) that is between 1.03 and 2.0. That corresponds to a "z/x" value, which is the same as "a/c" in terms of U.S. Pat. No. 6,841,581, that is less than one. These references encourage flattening cells in a foam's vertical direction to achieve lower thermal conductivity through the foam's thickness.

U.S. Pat. No. 6,315,932 further teaches increased thermally insulating properties are achieved in foam when the z/x ratio (a/c ratio in above notation) is one or less, thereby motivating flattening of cell dimensions in the vertical direction of foam to achieve enhanced thermally insulating properties.

EP561216B2 further directs flatting foam in its vertical direction to obtain increased thermal insulating properties.

It would advance the art of thermally insulating XPS foam to discover a new way to obtain an XPS foam that has a thermal conductivity, especially a long-term (25-year) thermal conductivity of 0.030 W/m*K or less, preferably 0.028 W/m*K or less, especially while also having a compressive strength of 200 kilopascals or more. Long-term thermal conductivity corresponds to thermal conductivity 25 years after manufacture as opposed to merely 30 days after manufacture as is the case with short-term thermal conductivity. Achieving a low "long-term" thermal conductivity is more challenging than achieving a low "short-term" thermal conductivity because thermal conductivity tends to increase over time as thermally insulating blowing agent gas in the cells permeates out from the foam.

BRIEF SUMMARY OF THE INVENTION

In contrast to what is known in the art from those references cited in the Background section above, the present invention surprisingly and unexpectedly provides a thermally insulating XPS foam that has a long-term thermal conductivity of 0.030 W/m*K or less, even 0.028 W/m*K or less through the vertical direction while having a cell orientation elongated in the foam vertical direction. This is in direct contrast to the teaching in prior art that flattening cell orientation in the vertical direction achieves lower thermal conductivity through the foam. Such thermal conductivity values are achievable with foam of the present invention while simultaneously achieving compressive strengths of 200 kilopascals or more in the vertical direction.

Figure 1:
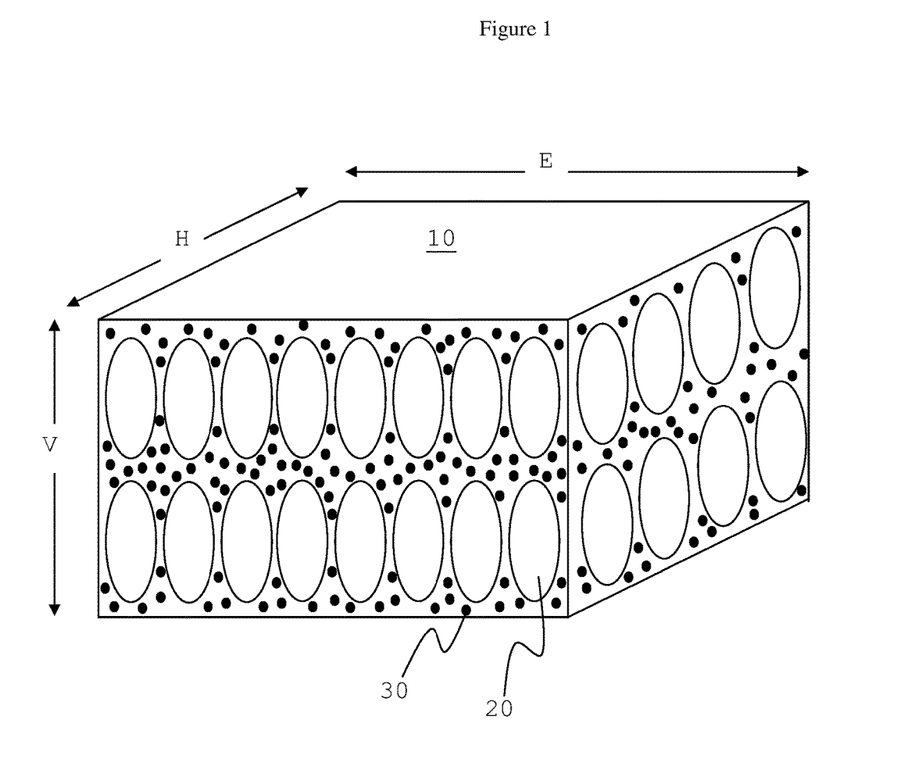
FIG. 1 is a cartoon illustrating an exemplary cross section of foam of the present invention illustrating general relative cell wall thicknesses and cell directions.

The present invention decreases the thermal conductivity through the thickness of a polymer foam beyond that achieved by merely adding infrared attenuating agent by surprisingly preparing the polymer foam with cell size orientation elongated in the vertical direction and while achieving a cell wall thickness that is preferentially thicker in the plane containing extrusion (longitudinal) and horizontal (transverse) directions of the foam relative to wall thicknesses in the vertical direction of the foam. FIG. 1 illustrates conceptually such foam.

Without being bound by theory, a combination of both including infrared attenuating agent and expanding so as to achieve thinner cell walls in the vertical direction than in the plane containing the horizontal and extrusion directions of the foam work may work together to decrease thermal conductivity through the foam in the vertical direction. Thinner walls in the vertical direction provide less thermal conduit through polymer in the vertical direction of the foam, thereby reducing thermal conductivity through the polymer walls along the foam's vertical direction. Thinning of cell walls in the vertical direction can also result in thicker walls in the plane perpendicular to the foam thickness. Since infrared attenuator resides in the polymer walls, having thicker cell walls in the plane perpendicular to the foam thickness results in preferential positioning of infrared attenuator in the path perpendicular to the foam thickness. Therefore, infrared radiation penetrating through the thickness of the foam will interact with more infrared attenuating agent than if the cell walls had an isotropic thickness or were thicker in the vertical direction. Additionally, thicker walls in the plane perpendicular to foam thickness are expected to reduce the diffusion rate of insulating cell gas (blowing agent) from the foam. The shortest path out from the foam is through the thickness dimension of the foam. By making that cell wall thicker in that direction, cell gas must escape more slowly through thicker walls or more slowly through a tortuous path in the plane of the width and length of the foam. Retaining insulating cell gas in foam will result in lower thermal conductivity through the foam for a longer period of time.

This concept is presented visually in the cartoon drawing of FIG. 1. Notably, the cartoon of FIG. 1 is not meant to present any particularly accurate relative scale but rather is for general illustrative purposes. FIG. 1 show a portion of foam 10 with vertical direction V, horizontal direction H and extrusion direction E. FIG. 1 reveals a cut-away view into the plane of the foam in the plane defined by V and H as well as the plane defined by V and E. Cells 20 are elongated in the V direction relative to both the H and E directions. The spacing between cells 20 is less in the H and E directions relative to the E direction, corresponding to thinner walls between cells in the H and E directions relative to the V direction. As a result, infrared attenuating agent 30 is preferentially located in the cell walls in the plane defined by the H and E directions, that is the walls perpendicular to the V direction.

The present invention required not only discovering the unexpected benefit to reducing thermal conductivity realized with the foam of the present invention but also discovering how to prepare foam of the present invention. To achieve the foam of the present invention, particular processing parameters are used to ensure both elongation of cells in the vertical direction and thinning of the cell walls in the vertical direction. For example, the foam must be made from a foamable polymer mixture that contains infrared attenuating agent and that is expanded into polymer foam while achieving a vertical blow up ratio that is a range of 4-12 while also achieving an extrusion blow up ratio in a range of 1-2.

In a first aspect, the present invention is an extruded polymer foam, the foam comprising a polymer matrix defining cells therein wherein the foam is characterized by: (a) the polymer matrix comprising styrene-acrylonitrile copolymer and 0.1 to 10 weight-percent infrared attenuator, based on foam weight, dispersed in the polymer matrix; (b) the cells having average sizes vertical, horizontal and extrusion directions, as determined by ASTM D-3576, such that: (i) the average size in the foam's vertical direction of 150 micrometers or less; (ii) the ratio of vertical cell size to extrusion direction cell size is greater than one; and (iii) e cell anisotropic ratio that is greater than 1.1; (c) having a P-Ratio of 0.7 or less, with compressive strength values determined according to ASTM D1621; (d) having less than 0.2 moles of hydrocarbon blowing agents in the cells per kilogram of foam as determined by gas chromatography; (e) having a density of 20 to 48 kilograms per cubic meter as determined by ASTM D1622; and (f) having an average 25-year thermal conductivity that is 0.030 Watts per meter-Kelvin or less when free of fluorinated blowing agents and less than 0.028 Watts per meter-Kelvin when containing fluorinated blowing agent, with 25-year thermal conductivity as determined by the slicing technique of EN13164.

In a second aspect, the present invention is a process for preparing the extruded polymer foam of the first aspect, the process comprising: (a) providing a foamable polymer mixture comprising styrene-acrylonitrile copolymer, 0.1 to 10 weight-percent infrared attenuator based on foamable polymer mixture weight and a blowing agent that contains less than 20 mole-percent hydrocarbon based on total moles of blowing agent and providing the foamable polymer mixture at an initial pressure that prevents expansion of the blowing agent; (b) extruding the foamable polymer mixture through a die at a die pressure that is greater than six megapascals and at a foaming temperature in a range of 110 to 135 degrees Celsius into a region of pressure below the initial pressure; and (c) allowing the foamable polymer mixture to expand into a polymer foam while controlling the expansion of the foamable polymer mixture so that the expansion achieve a vertical blow up ratio in a range of 4-12 and an extrusion blow up ratio in a range of 1-2.

The process of the present invention is useful for preparing the foam of the present invention, which is useful as a thermally insulating material.

DETAILED DESCRIPTION OF THE INVENTION

Test methods refer to the most recent test method as of the priority date of this document unless a date is indicated with the test method number. References to test methods contain both a reference to the testing society and the test method number. Test method organizations are referenced by one of the following abbreviations: ASTM refers to American Society for Testing and Materials; EN refers to European Norm; DIN refers to Deutsches Institut für Normung; and ISO refers to International Organization for Standards.

All ranges include endpoints unless otherwise stated. "And/or" means "and, or as an alternative".

Foam articles have three mutually perpendicular dimensions: length, width and thickness. The length dimension lies along the longest dimension of a foam article and typically is along the extrusion direction of an extruded foam article. The thickness dimension is the dimension that has the smallest magnitude but can be equal to the length, for example, as in a cube. Width is mutually perpendicular to length and thickness and can have a magnitude equal to or less than the length and equal to or greater than the thickness.

Extruded foam articles also have three mutually perpendicular directions associated with them that are identified as vertical, horizontal, and extrusion (longitudinal) directions. The thickness dimension of an extruded foam lies generally along the vertical direction of the foam during extrusion. The width dimension of an extruded foam lies generally along the horizontal direction of the foam during extrusion. The extrusion, or longitudinal, dimension corresponds to the direction of extrusion and the length dimension of an extruded foam lies along the extrusion direction during extrusion.

Polymer foam has a polymer matrix defining cells therein. The polymer foam of the present invention has a polymer matrix comprising styrene-acrylonitrile (SAN) copolymer. Desirably, SAN copolymer is more than 50 weight-percent (wt %), preferably 60 wt % or more, more preferably 70 wt % or more and can be 80 wt % or more, 90 wt % or more 95 wt % or more and even 100 wt % of the polymer in the polymer matrix of the present foam. Generally, the SAN copolymer contains one wt % or more, preferably five wt % or more, even more preferably ten wt % or more and can contain 12 wt % or more copolymerized acrylonitrile based on total SAN copolymer weight while at the same time typically contains 50 wt % or less, preferably 30 wt % or less and more preferably 20 wt % or less and can contain 15 wt % or less copolymerized acrylonitrile based on total SAN copolymer weight. Desirably, the SAN copolymer additionally has a melt flow rate (MFR) that is 0.5 decigrams per 10 minutes (dg/10 min) or more, preferably one dg/10 min or more and more preferably three dg/10 min or more while at the same time is desirably 50 dg/min or less, preferably 30 dg/10 min or less and more preferably 20 dg/10 min or less where MFR is measured according to ASTM D1238 at 200 degrees Celsius (° C.) using a five kilogram weight (200° C./5 kg).

The polymer matrix can comprise more than one SAN copolymer. For example, the polymer matrix can comprise two or more SAN copolymers that differ in MFR and/or copolymerized acrylonitrile level and/or any other SAN copolymer property.

The polymer of the polymer matrix can comprise a blend of polystyrene and SAN copolymer. For example, the polymer in the polymer matrix can consist of a blend of polystyrene and SAN copolymer. Generally, however, there can be up to five percent, even ten percent of yet another polymer such as, for example, polymeric flame retardant, and/or polymer used to compound additives for inclusion in the polymer matrix.

The polymer matrix further comprises infrared attenuator dispersed in the polymer matrix. Desirably, the infrared attenuator is selected from a group consisting of carbon black (including furnace black, lamp black and thermal black), graphite (including natural, synthetic, surface-treated, functionalized, expanded and expandable forms of graphite) and titanium dioxide. The infrared attenuator desirably has an average particle size of 15 micrometers or less, preferably five micrometers or less, more preferably 350 nanometers (nm) or less, and can be 300 nm or less, 100 nm or less, 50 nm or less, 10 nm or less, even one nm or less while at the same time is generally one nanometer (nm) or more, preferably ten nm or more, and more preferably 30 nm or more. Determine average particle size of the infrared attenuator by laser diffraction according to ASTM B822-10. Examples of suitable infrared attenuators include those listed in Table 1.

TABLE 1

| Type | Supplier | Product Name | Particle Size |
|---|---|---|---|
| Furnace Black | Degussa | Panther 17 | 26 nanometers (nm) |
| Furnace Black | Degussa | Arosperse 7 | 62 nm |
| Furnace Black | Degussa | Arosperse 60 | 91 nm |
| Lamp Black | Degussa | Lamp Black 101 | 95 nm |
| F Thermal Black | Asahi Carbon | Fine Thermal | 80 nm |
| Thermal Black | Degussa | Arosperse 15 | 290 nm |
| Thermal Black | Columbian Chemical | Sevacarb MT-LS | 300 nm |
| Graphite natural | Timcal, Imerys | Timrex ®* GA 98/10 | 10 micrometers (μm) |
| Graphite natural | Clariant | SL90025506 | 6.4 μm |
| Graphite natural | Graphite Sales Inc. | FP-428 | 10.5 μm |
| Graphite synthetic | Graphite Sales Inc. | FP-165 | 12 μm |
| Graphite ultrafine | Graphit Kropfmuehl Ag | UF1 98 C | 3 μm |
| Graphite ultrafine | Graphit Kropfmuehl Ag | UF2 98 | 4.5 μm |

*Timrex is a trademark of Timcal SA Corp.

The infrared attenuator is generally present at a concentration of 0.1 wt % or more, preferably 0.2 wt % or more, more preferably 0.5 wt % or more, still more preferably one wt % or more and can be present at two wt % or more, three wt % or more, four wt % or more, even five wt % or more while at the same time is typically present at a concentration of 10 wt % or less, preferably nine wt % or less, eight wt % or less seven wt % or less, even six wt % or less. Determine infrared attenuator concentration based on total polymer foam weight.

The foam of the present invention has specific cell size characteristics. Determine average cell size in the vertical, horizontal and extrusion directions according to ASTM D-3576.

The cells of the polymer foam have an average size in the foam's vertical direction of 150 micrometers (μm) or less, and can be 125 μm or less, even 100 μm or less while at the same time, the average cell size in the foam's vertical direction is generally one μm or greater.

The cells of the polymer foam also have a ratio of average vertical cell size to average extrusion direction cell size (z/x or a/c value) that is greater than one and can be 1.05 or more and even 1.1 or more.

The cells of the polymer foam further have an cell anisotropic ratio (k) that is greater than 1.1, and that is preferably 1.15 or more, and can be 1.20 or more, even 1.30 or more. That means that the cells are elongated along the vertical direction of the foam relative to the horizontal and extrusion direction of the foam. Surprisingly, such cell anisotropy can be achieved in the present invention without use of particles, such as needle-like particulate additives, having one or more dimension that is 100 nanometers or smaller and as such, foam of the present invention can be free of needle-like particular additives including those having one or more dimension that is 100 nanometers or smaller.

The polymer matrix defining the cells is further characterized by having thinner walls in the vertical direction than in the plane perpendicular to the vertical direction. Measuring cell wall thickness directly is extremely challenging. Nonetheless, relative wall thicknesses can be determined readily from compressive strength values for the foam. Cell wall thicknesses contribute foam compressive strength. As cells thin in a certain foam direction, the compressive strength of the foam in that direction is expected to become smaller since the cell walls cannot support as much force.

Compressive balance ($C_F$) is defined as the ratio of the compressive strength in the vertical direction ($\sigma_v$) of the foam divided by the average of the compressive strengths in the extrusion direction ($\sigma_E$) and horizontal direction ($\sigma_H$) of the foam:

Compressive Balance=$C_F$=$\sigma_v/[\sigma_E+\sigma_H)/2]$

A theoretical model for calculating $C_F$ for a foam having an isotropic polymer matrix structure around its cells and a given cell anisotropic ratio has been developed and published by Gibson and Ashby in Cellular Solids, Structure & Properties, chapter 6.3, Pergamon Press, First Edition, (1988), pages 182-197. That model can be used to calculate the theoretical $C_F$ for a foam given the cell anisotropic ratio. It reasonably follows that if a foam has a $C_F$ value that is less than the $C_F$ value predicted by Gibson and Ashby then the cell walls in the vertical direction must be thinner than would be expected in an isotropic cell structure—meaning the cell structure is thinner in the vertical direction than expected in an isotropic cell structure. Thinner walls in the vertical direction result in weaker struts in the vertical direction, and expected lower compressive strength values in the vertical direction. If the walls are thinned in the vertical direction, it follows that the wall are thicker in the plane perpendicular to the vertical direction where compressive strength is greater.

Figure 2:
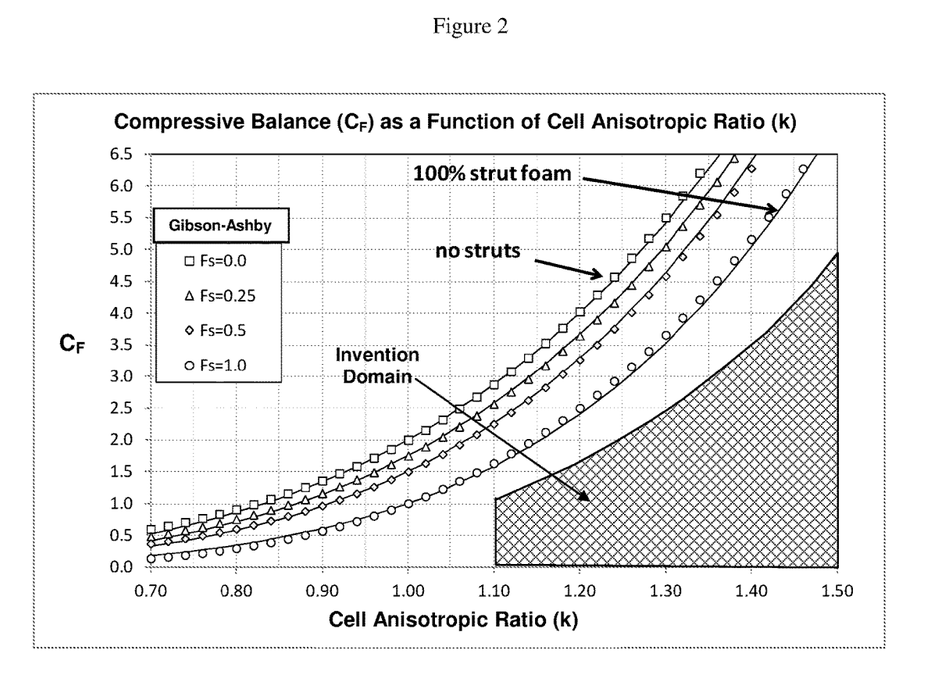
FIG. 2 is a plot of Gibson-Ashby Compressive Balance ($C_F$) values as a function of cell anisotropic ratio for polymeric foam illustrating Gibson-Ashby CF values and also where the present inventive foam resides on such a plot.

The theoretical model of Gibson and Ashby takes into account cell wall structure by defining a "strut fraction" value ($F_S$). The strut fraction value ranges from zero to one, and takes into account whether the foam structure is highly reticulated with just struts defining the cells (strut fraction of one) or is a closed-cell structure with cell walls defining the cells (strut fraction of zero). FIG. 2 illustrates a plot of Gibson-Ashby $C_F$ values as a function of cell anisotropic ratio (k) for different strut fraction values including zero and one.

The "P-Ratio" of a foam is the ratio of actual measured $C_F$ value for a foam to the theoretical Gibson-Ashby $C_F$ value for that foam:

$$P \text{ Ratio} = C_F/\text{Gibson-Ashby } C_F$$

When the P-Ratio is one, the foam has an isotropic polymer matrix structure around the cells. When the P-Ratio is greater than one, the foam has greater polymer matrix structure in the vertical direction and less in the plane perpendicular to the vertical direction. When the P-Ratio is less than one, the foam has less polymer matrix structure in the vertical direction and more in the plane perpendicular to the vertical direction. Notably, for determining P-Ratio a strut fraction of one was selected for the theoretical calculations because this selection resulted in the lowest theoretical $C_F$ values. As a result, if a P-Ratio value was found to be less than one it was not because of an artificially low strut fraction value selection but truly because of thinner vertical cell structure. When the strut fraction is one, the Gibson-Ashby $C_F$ value is $k^{4.8}$.

The polymer foam of the present invention has a P-Ratio of 0.7 or less, preferably 0.65 or less and can have a P-Ratio of 0.60 or less, 0.55 or less even 0.50 or less. That means the foam of the present invention has substantially thinner cell walls in the vertical direction than in the plane perpendicular to the vertical direction. At the same time, the P-Ratio value is greater than zero and typically greater than 0.10 and can be greater than 0.20, 0.30, 0.40 and even 0.50.

Included in FIG. 2 is a designation of where foam of the present invention resides relative to the curves of Gibson-Ashby $C_F$ values to provide a visual perspective of the present invention relative to theoretical calculations for foam having an isotropic polymer matrix structure around the cells.

Compressive Strength Ratio is another measure of anisotropy in compressive strength for foam. Compressive Strength Ratio is the ratio of compressive strength in the vertical direction divided by the sum of compressive strengths in the vertical, horizontal and extrusion directions. Desirably, the foam has a Compressive Strength Ratio of 0.5 or less, preferably 0.45 or less and more preferably 0.40 or less.

Despite having wall that are selectively thinned in the vertical direction, the polymer foam desirably has a compressive strength in the vertical direction of 200 kilopascals (kPa) or more, preferably 250 kPa or more, still more preferably 300 kPa or more, and yet more preferably 350 kPa or more for optimal durability during handling.

Determine compressive strength values for polymer foam according to ASTM D1621, including compressive strength values used to determine $C_F$, P-Ratio and Compressive Strength Ratio.

The polymer foam has a density of 48 kilograms per cubic meter (kg/m³) or less, preferably 40 kg/m³ or less, more preferably 36 kg/m³ or less and can be 30 kg/m³ or less, even 25 kg/m³ or less while at the same time is generally 20 kg/m³ or more. Determine density of the polymer foam according to ASTM D1622.

The polymer foam has a surprisingly low 25-year thermal conductivity. Even in the absence of halogenated blowing agent the polymer foam has a 25-year thermal conductivity value of 0.030 Watts per meter-Kelvin (W/m*K) or less, preferably 0.029 W/m*K or less, still more preferably 0.028 W/m*K or less. When fluorinated blowing agent is present, especially at a concentration of six wt % or more of the cell gas concentration, the polymer foam has a 25-year thermal conductivity value of less than 0.029 W/m*K, preferably 0.028 W/m*K or less, more preferably 0.027 W/m*K or less, even more preferably 0.026 W/m*K or less and can be 0.025 W/m*K or less. While a lower limit on thermal conductivity has not been established, it is generally the case that the foam has a 25-year thermal conductivity value of 0.01 W/m*K or more, typically 0.02 W/m*K or more. Determine 25-year thermal conductivity value of polymer foam according to the slicing technique of EN13164.

25-year thermal conductivity values should not be confused with thermal conductivity values determined for much shorter time periods. For instance, method EN8301 determines thermal conductivity for foam that has typically aged anywhere from two weeks to three months after manufacturing. JIS A9511P is for determining thermal conductivity only seven days after manufacture. The shorter the period of time between foam manufacturing and thermal conductivity evaluation, the lower the thermal conductivity is expected to be because thermally insulating cell gas tends to permeate out from foam over time. For styrenic foam manufactured using fugitive auxiliary blowing agents such as carbon dioxide, alcohol, ether and/or chlorinated hydrocarbons it is reasonable for thermal conductivity values to increase 0.004 to 0.008 W/m*K between freshly made foam measurement and 25-year determination.

The gas in the foam cells can have an effect on the thermal conductivity of the foam. One method of reducing thermal conductivity in foam is to include hydrocarbons in the cells. However, the present invention achieves the stated 25-year thermal conductivity values even when containing 0.20 mole or less, and can contain 0.15 mole or less, 0.10 mole or less, 0.05 mole or less or even zero mole of hydrocarbon per kilogram of foam. Determine the amount of hydrocarbon in the cell gas by gas chromatography.

Desirably, the foam contains a fluorinated blowing agent as a component of the gas in the cells of the foam. Desirably, the amount of fluorinated blowing agent is 0.05 mole or more, preferably 0.1 mole or more and can be 0.2 mole or more while at the same time is generally less than 1.2 mole and can be 1.0 mole or less, and even 0.8 mole or less per kilogram of foam. Determine the amount of fluorinated blowing agent in the cell gas by gas chromatography.

The fluorinated blowing agent is typically selected from a group consisting of chlorine-free saturated fluorocarbons, unsaturated fluoroolefins and chlorofluoroolefins. Desirably, the fluorinated blowing agent is chlorine-free. Examples of desirable fluorinated blowing agents include any one or combination of more than one selected from a group consisting of difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3- pentafluoropropane (HFC-245fa), and 1,1,1,3,3-pentafluorobutane (HFC-365mfc), hexafluoropropene; 2-fluoropropene (HFO-1261yf), 1-fluoropropene (HFO-1261ze); 1,1-difluoropropene (HFO-1252zc); 3,3-difluoropropene (HFO-1252zf); 3,3,3-trifluoropropene (HFO-1243zf); 2,3,3-trifluoropropene (HFO-1243yf); 1,3,3,3-tetrafluoropropene (HFO-1234ze); 3,3,3,3-tetrafluoropropene (HFO-1234yf); 1,1,3,3-tetrafluoropropene (HFO-1234zc); 1,2,3,3,3-pentafluoropropene (HFO-1225ye); 1,1,1,4,4,4-hexafluoro-2-butene (HFO-1336mzz); 1-chloro, 3,3,3-trifluoropropene (HCFO-1233zd); 4,4,4-trifluoro-1-butene; 3,4,4,4-tetrafluoro-1-butene; 1,1,3,3,3-pentafluoro-2-methyl-1-propene; octafluoro-1-butene; octafluoro-2-butene; 2,3,3,4,4,4-hexafluoro-1-butene; 1,1,1,2,4,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-pentafluoro-1-butene; 1,2,3,3,4,4,4-heptafluoro-1-butene; 1,1,2,3,4,4,4-heptafluoro-1-butene; and 1,3,3,3-tetrafluoro-2-(trifluoromethyl)-propene. The fluorinated blowing agent is desirably a blend of saturated fluorocarbons and unsaturated fluorocarbons ("fluoroolefins") and/or unsaturated chlorofluorocarbons ("chlorofluoroolefins").

The foam desirably has an open cell content of 30 percent (%) or less, preferably 20% or less, still more preferably 10% or less, even more preferably 5% or less, yet even more preferably 2% or less and can have an open cell content of one percent or less or even zero percent. Determine open cell content according to ASTM D6226-05.

The polymer foam is extruded polymer foam, which means it is made by an extrusion foaming process. Characteristic to extruded polymer foam is the fact the foam is free from relatively thick cell walls encompassing groups of cell having relatively thinner cell walls as is characteristic of expanded polystyrene foam, or bead foam. The relatively thicker cell walls correspond to the thicker wall of the beads that fuse together to form the bulk foam. Extruded foam is prepared by extruding a foamable polymer mixture comprising a polymer in a softened state and a blowing agent through a die into an atmosphere of sufficiently low pressure to allow the blowing agent to expand the softened polymer mixture into foam. The polymer foam of the present invention is made by the process of the present invention.

Foam of the present invention can be used to prepare articles comprising one or more than one foam present invention. For example, multiple foams of the present invention can be laminated together in prepare articles of greater thickness than any individual foam in the article. Foam of the present invention can also be laminated to foams outside the scope of the present invention and/or even non-foam materials. Lamination can be by any means including use of an adhesive or thermally laminating (melt-welding) polymer elements together.

The process of the present invention is an important discovery in the discovery of the foam of the present invention. The process was found to produce foam having the necessary cell size anisotropy and cell wall thickness anisotropy to achieve the presently claimed foam.

The process of the present invention comprises providing a foamable polymer mixture comprising SAN copolymer, 0.1 to 10 wt % of an infrared attenuator based on foamable polymer mixture weight and a blowing agent that comprises less than 20 mole-percent (mol %) hydrocarbon based on total moles of blowing agent. The blowing agent can comprise 15 mol % or less, 10 mol % or less and five mol % or less and can even be free of hydrocarbon blowing agent, with mol % relative to total moles of blowing agent. Desirable concentrations for the infrared attenuator and hydrocarbon blowing agent are the same as those described for the foam but with wt % of infrared attenuator relative to foamable polymer mixture weight and mol % hydrocarbon blowing agent relative to total moles of blowing agent. Desirable selections of infrared attenuator are those described for the polymer foam. Provide the foamable polymer mixture at an initial pressure that prevents expansion of the blowing agent.

Extrude the foamable polymer mixture through a die at a die pressure that is greater than six megapascals (MPa) and at a foaming temperature that is 110 degrees Celsius (° C.) or more, preferably 115° C. or more and can be 120° C. or more, even 125° C. or more and at the same time is 135° C. or less into a region of pressure below the initial pressure. Die pressure corresponds to the pressure of the foamable polymer mixture just prior to exiting the die. The foaming temperature (or "die temperature") is the temperature at which the die is maintained and corresponds to the temperature of the foamable polymer mixture as it extrudes from the die.

Allow the foamable polymer mixture to expand into polymer foam while controlling the expansion of the foamable polymer mixture so as to achieve a vertical blow up ratio (VBUR) and an extrusion blow up ratio (EBUR) that fall within specific values. The VBUR is controlled to be four or more, preferably six or more, more preferably seven or more, even more preferably eight or more and at the same time 12 or less, preferably 11 or less, more preferably 10 or less and still more preferably 9 or less. The EBUR is controlled to be one or more, preferably 1.2 or more and at the same time two or less, preferably 1.8 or less and can be 1.7 or less and even 1.6 or less. VBUR is thickness of the resulting foam in the vertical direction divided by the height of the die opening in the vertical direction. Control of vertical blow up ratio is possible, for instance, with the use of forming plates that restrict the height to which vertical expansion can occur as well as selection of foaming temperature and blowing agent. EBUR is the speed at which the foamable polymer mixture exits the die in the extrusion direction divided by the line speed of the final foam, that is speed of the final foam in the extrusion direction after expansion is complete. Control of the extrusion blow up ratio is possible by controlling the line speed, or how rapidly final foam is transported in the process for example by using rollers that slow or speed up transport of the expanded foam in the extrusion direction relative to the rate of extrusion through the die in the extrusion direction.

Optionally, the process can further include a post extrusion expansion using steam and/or hot air at a temperature range of 95-125° C. Exposing the extruded foam to such steam and/or hot air can induce additional expansion by softening the polymer and expanding the blowing agent within the cells of the foam.

The blowing agent in the foamable polymer mixture desirably contains a fluorinated blowing agent, as described for the cell gas of the polymer foam. The blowing agent can comprise the same amounts of fluorinated blowing agent as described for the gas in the cell of the polymer foam.

In addition, or as an alternative to the fluorinated blowing agent, the blowing agent can desirably comprise 15 mol % or more and generally 80 mol % or less water based on total moles of blowing agent. Alternatively, or additionally to any other blowing agent, the blowing agent in the foamable polymer composition can comprise carbon dioxide at a concentration of zero to 85 mol % based on total moles of blowing agent.

The foamable polymer composition, and resulting polymer matrix of the polymer foam, can contain additives common to polymer foam including flame retardant additive, antioxidants, colorants, processing aids, and cell control agents such as talc or polyethylene.

EXAMPLES

Fluorine-Free Blowing Agent

Prepare Comparative Examples (Comp Ex) CE1, CE2, CE3 and Examples (Exs) 1-3 using a fluorine-free blowing agent composition consisting of 4 weight-parts carbon dioxide, 0.9 weight-parts water and one weight-part iso-butane with weight parts based on 100 weight parts polymer resin. The total mole percent of carbon dioxide, water and hydrocarbon blowing agent is 57.5, 31.6 and 10.9 mole-percent respectively based on total moles of blowing agent.

Combine the blowing agent composition and infrared attenuating agent with thermally softened SAN copolymer resin in an extruder to form a foamable polymer mixture. The infrared attenuating agent is selected from carbon black (Thermax™ N990, Thermax is a trademark of Cancarb) and graphite (Ultra Fine Graphite UF-1, available from AMG Mining AG, Kropfmuehl) with concentrations identified in Table 1 for the particular examples. Feed carbon black and graphite into the extruder as a concentrate in styrenic polymer. The carbon black is 60 wt % carbon black in styrenic polymer and the graphite is 30 wt % graphite in styrenic polymer based on total concentrate weight.

The SAN copolymer resin is a 50/50 by weight dry-blend of two SAN resins: SAN A and SAN B. SAN A contains 15 wt % copolymerized acrylonitrile by total copolymer weight and has a MFR of 12.3 dg/10 min. SAN B contains 15 wt % copolymerized acrylonitrile based on total copolymer weight and has a MFR of 5.9 dg/10 min.

Prepare the foamable polymer mixture at 210° C. and at a pressure of approximately 17 megapascals so as to provide an extrudable foamable polymer mixture at a pressure that precludes expansion of the blowing agent.

Extrude the foamable polymer mixture through a die having an opening height (die gate height) and at a die pressure and foaming temperature into an atmosphere at a lower pressure than the die pressure. Allow the foamable polymer mixture to expand into foam after exiting the die while controlling the vertical blow up ratio (VBUR) by limiting the vertical expansion of the extruded foamable polymer mixture using parallel forming plates and by controlling extrusion blow up ratio (EBUR) by adjusting the speed of pull rollers that govern the extrusion direction line speed of the expanded foam. Die gate height, die pressure, foaming temperature, pressure drop upon exiting die and blow up ratios are in Table 1 for the specific examples.

Resulting foam properties are reported in Table 1 for Comp Exs CE1, CE2, CE3 as well as Exs 1-3. The unit "pph" means weight parts per hundred based on total polymer weight. The unit "mm" means millimeter.

TABLE 1

| Property | Units | CE1 | Ex 1 | CE2 | Ex 2 | Ex 3 | Ex 4 |
|---|---|---|---|---|---|---|---|
| Formulation and Process Properties | | | | | | | |
| Graphite Concentration | pph | 0 | 0 | 0 | 0 | 3 | 1.5 |
| Carbon Black Concentration | pph | 5 | 5 | 3 | 3 | 0 | 0 |
| Foaming Temperature | ° C. | 124 | 124 | 132 | 124 | 124 | 132 |
| Die Pressure | MPa | 8.9 | 8.9 | 9.1 | 8.7 | 9.3 | 9.1 |
| Pressure Drop | MPa | 8.9 | 8.9 | 7.8 | 8.5 | 7.5 | 7.2 |
| Die Gate Height | mm | 2.2 | 2.2 | 1.7 | 1.94 | 1.48 | 1.3 |
| VBUR | — | 12.5 | 8.3 | 12.1 | 8.2 | 10.1 | 10.5 |
| EBUR | — | 0.9 | 1.5 | 1.2 | 1.6 | 1.4 | 1.6 |
| Foam Properties | | | | | | | |
| Thickness | mm | 27 | 15 | 20 | 16 | 15 | 14 |
| Density | kg/m$^3$ | 32.4 | 33.6 | 28.4 | 31.1 | 31.9 | 27.7 |
| Percent open cells | % | 0.9 | 0.2 | 2.6 | 0.3 | 0.0 | 7.4 |
| Average Vertical Cell Size (z) | mm | 0.12 | 0.12 | 0.14 | 0.17 | 0.07 | 0.09 |
| Average Extrusion Cell Size (x) | mm | 0.08 | 0.09 | 0.12 | 0.13 | 0.06 | 0.07 |
| Average Horizontal Cell Size (y) | mm | 0.09 | 0.11 | 0.13 | 0.13 | 0.06 | 0.07 |
| z/x | — | 1.50 | 1.33 | 1.17 | 1.31 | 1.17 | 1.29 |
| Cell anisotropic ratio (k) | — | 1.26 | 1.13 | 1.08 | 1.20 | 1.18 | 1.18 |
| Vertical Compressive Strength | kPa | 496 | 354 | 362 | 396 | 329 | 284 |
| Extrusion Compressive Strength | kPa | 151 | 338 | 175 | 295 | 296 | 240 |
| Horizontal Compressive Strength | kPa | 157 | 194 | 138 | 198 | 155 | 151 |
| Compressive Balance ($C_F$) | — | 3.22 | 1.33 | 2.31 | 1.61 | 1.46 | 1.45 |
| Gibson-Ashby $C_F$ | — | 3.03 | 1.82 | 1.44 | 2.36 | 2.19 | 2.10 |
| P-Ratio | — | 1.1 | 0.73 | 1.6 | 0.68 | 0.67 | 0.69 |
| 25-year thermal conductivity | W/m * K | 0.031 | 0.030 | 0.032 | 0.030 | 0.028 | 0.030 |

The data in Table 1 reveals the correlation of P-Ratio to 25-year thermal conductivity discovered with the present invention as well as the effect of vertical and extrusion blow up ratios in preparing foam of the present invention.

CE1 and Ex 1 are similar foams prepared in a similar manner, except the VBUR of CE1 is greater than 12 and the EBUR of CE1 is less than one. The resulting CE1 foam has a P-Ratio that is significantly greater than 0.7 (it is 1.1) and a 25-year thermal conductivity of 0.031 W/m*K. In contrast, Ex 1 was made using a VBUR of less than 12 and an EBUR between 1 and 2. The resulting Ex 1 foam has a P-Ratio that is essentially 0.7 and a 25 year thermal conductivity of 0.030 W/m*K, which is lower than that of CE1.

Ex 1 demonstrates a foam and process of the present invention comprising carbon black as an infrared attenuator at two different concentrations and using a blowing agent free of fluorinated components. Exs 2 and 3 demonstrate foams and processes of the present invention comprising graphite as an infrared attenuator at two different concentrations and using a blowing agent free of fluorinated components. These examples illustrate that the foam of the present invention can achieve 25-year thermal conductivity values using the process of the present invention without halogenated blowing agents as thermally insulating cell gas.

Fluorine-Containing Blowing Agent Prepare Comp Exs CE4 and CE 5 and Exs 4-7 in a similar manner as the fluorine-free examples and comparative examples, except use a blowing agent comprising a fluorinated component as described herein below. Otherwise, prepare the foams in like manner as described for the fluorine-free examples and comparative examples with specifics provided in Table 2 instead of Table 1. Likewise, foam properties for CE4, C5, DE6 and Exs 4-7 are in Table 2.

Prepare Comp Exs CE4 and CE5 and Exs 4-7 using a blowing agent composition consisting of 1.2 weight-parts carbon dioxide, 0.9 weight-parts water and 7.5 weight-parts 1,1,1,2-tetrafluoroethane (HFC-134a) with weight parts based on 100 weight parts polymer resin. The total mole-percent (mol %) of carbon dioxide, water, hydrocarbon and fluorocarbon blowing agents are 18.1, 33.2, 0.0 and 48.9 mol % respectively based on total moles of blowing agent.

Prepare CE6 using a blowing agent composition consisting of 1.2 weight-parts water, 0.6 weight-parts iso-butane, 0.4 weight-parts ethanol, and 5.5 weight-parts 1,3,3,3-tetrafluoropropene (HFO-1234ze) with weight parts based on 100 weight parts polymer resin.

The total mole-percent (mol %) of carbon dioxide, water, hydrocarbon, ethanol and fluoroolefin blowing agents are 0.0, 50.4, 7.6, 6.4 and 35.6 mol % respectively based on total moles of blowing agent.

The data in Table 2, like that of Table 1, reveal the correlation of P-Ratio to 25-year thermal conductivity discovered with the present invention as well as the effect of vertical and extrusion blow up ratios in preparing foam of the present invention using a fluorinated blowing agent.

CE4 and Ex 4 are similar foams prepared in a similar manner, except the VBUR of CE4 is greater than 12 and the EBUR of CE1 is less than one and the cell anisotropic ratio is less than 1.1. The resulting CE4 foam has a P-Ratio that is much greater than 0.70 and a 25-year thermal conductivity of 0.031 W/m*K. In contrast, Ex 5 was made using a VBUR of less than 12, an EBUR between 1 and 2 and a cell anisotropic ratio that is greater than 1.1. The resulting Ex 4 foam has a P-Ratio that is much less than 0.70 and a 25 year thermal conductivity of 0.026 W/m*K, much lower than that of CE3.

Likewise, CE5 and Ex 6 are similar foams prepared in a similar manner, except the VBUR of CE5 is greater than 12. The resulting CE5 foam has a P-Ratio greater than 0.70 and a 25-year thermal conductivity that is 0.029 W/m*K. In contrast, Ex 6 has a similar composition yet is made using a VBUR that is 9.7. The foam of Ex 6 has a P-Ratio of 0.55 and a 25-year thermal conductivity of 0.027 W/m*K. Again, achieving a P-Ratio below 0.70 by controlling the VBUR and EBUR is shown to produce foam having a 25-year thermal conductivity of less than 0.029 W/m*K for foam containing fluorinated blowing agent.

Exs 4 and 5 demonstrate foams and processes of the present invention comprising graphite as an infrared attenuator at different concentrations and using a blowing agent including a fluorinated blowing agent. Exs 6 and 7 demonstrate foams and processes of the invention comprising carbon black as an infrared attenuator at two different concentrations and using a blowing agent that includes a fluorinated blowing agent. These examples illustrate the ability to achieve with foams of the present invention 25-year thermal conductivity values of less than 0.029 W/m*K using the process of the present invention. The unit "pph" means weight parts per hundred based on total polymer weight and "mm" means millimeter.

TABLE 2

| Property | Units | CE3 | Ex 5 | Ex 6 | CE4 | Ex 7 | Ex 8 | Ex 9 |
|---|---|---|---|---|---|---|---|---|
| Formulation and Process Properties | | | | | | | | |
| Graphite Concentration | pph | 1.5 | 1.5 | 3 | 0 | 0 | 0 | 0.9 |
| Carbon Black Concentration | pph | 0 | 0 | 0 | 5 | 5 | 3 | 0 |
| Foaming Temperature | °C. | 130 | 120 | 120 | 130 | 130 | 121 | 117 |
| Die Pressure | MPa | 9.0 | 8.6 | 8.2 | 9.3 | 9.3 | 8.9 | 5.6 |
| Pressure Drop | MPa | 6.7 | 8.0 | 7.2 | 7.4 | 7.4 | 7.9 | 8.1 |
| Die Gate Height | mm | 1.17 | 1.68 | 1.44 | 1.45 | 1.45 | 1.65 | 4.72 |
| VBUR | — | 17.1 | 7.7 | 9.0 | 12.5 | 9.7 | 9.1 | 6.9 |
| EBUR | — | 0.8 | 1.4 | 1.3 | 1.1 | 1.5 | 1.3 | 1.2 |
| Foam Properties | | | | | | | | |
| Thickness | mm | 20 | 13 | 13 | 18 | 14 | 15 | 32.5 |
| Density | kg/m$^3$ | 29.8 | 40.0 | 37.8 | 30.4 | 31.0 | 36.3 | 49.1 |
| Percent open cells | % | 8.2 | 0.2 | 0 | 0.5 | 0 | 0 | <5 |
| Average Vertical Cell Size (z) | mm | 0.07 | 0.08 | 0.07 | 0.11 | 0.12 | 0.11 | 0.16 |
| Average Extrusion Cell Size (x) | mm | 0.06 | 0.06 | 0.06 | 0.08 | 0.08 | 0.08 | 0.12 |
| Average Horizontal Cell Size (y) | mm | 0.07 | 0.06 | 0.06 | 0.10 | 0.10 | 0.08 | 0.15 |
| z/x | — | 1.17 | 1.33 | 1.17 | 1.35 | 1.50 | 1.38 | 1.33 |
| Cell anisotropic ratio | — | 1.08 | 1.21 | 1.11 | 1.15 | 1.22 | 1.24 | 1.12 |

TABLE 2-continued

| Property | Units | CE3 | Ex 5 | Ex 6 | CE4 | Ex 7 | Ex 8 | Ex 9 |
|---|---|---|---|---|---|---|---|---|
| (k) | | | | | | | | |
| Vertical Compressive Strength | kPa | 385 | 468 | 472 | 360 | 330 | 389 | 410 |
| Extrusion Compressive Strength | kPa | 192 | 460 | 440 | 205 | 272 | 340 | 431 |
| Horizontal Compressive Strength | kPa | 169 | 302 | 279 | 183 | 201 | 239 | 503 |
| Compressive Balance ($C_F$) | — | 2.13 | 1.23 | 1.31 | 1.86 | 1.40 | 1.34 | 0.88 |
| Gibson-Ashby $C_F$ | — | 1.28 | 2.51 | 1.64 | 1.61 | 2.56 | 2.77 | 1.76 |
| P-Ratio | — | 1.66 | 0.49 | 0.80 | 1.16 | 0.55 | 0.48 | 0.50 |
| 25-year thermal conductivity | W/m * K | 0.031 | 0.026 | 0.025 | 0.029 | 0.027 | 0.026 | 0.026 |

Examination of U.S. Pat. No. 7,919,538 Foam

U.S. Pat. No. 7,919,538 provides teaching for SAN copolymer foam containing infrared attenuating agent. While U.S. Pat. No. 7,919,538 reports "long term thermal conductivity" values for its examples, it is important to realize that the thermal conductivity values were determined according to method EN8301 (see column 5, lines 42-43) and were measured 14 days after manufacture of the foam. The "long term thermal conductivity" values in U.S. Pat. No. 7,919,538 are 14-day values as opposed to 25-year values reported herein. Therefore, to do a fair comparison of foams from U.S. Pat. No. 7,919,538 to those of the present invention, the foams of U.S. Pat. No. 7,919,538 were evaluated according to the present process and analysis used for the present invention.

A summary for most of the Examples from U.S. Pat. No. 7,919,538 is provided in Table 3. Absent form Table 3 are Examples 3-4 from U.S. Pat. No. 7,919,538, none of which are reported to have a "long term" (that is, 14-day) thermal conductivity in the claimed range of the present invention.

The unit "pph" means weight parts per hundred based on total polymer weight. The unit "mm" means millimeter.

Examination of the examples from U.S. Pat. No. 7,919,538 reveals that the technology of this reference was not able to achieve 25-year thermal conductivity values as low as that of the presently claimed invention. The process of the present invention provides polymer foam having a P-Ratio that is 0.7 or less, an average vertical cell size of 150 micrometer or less, a cell anisotropic ratio that is greater than 1.1 and a ratio of vertical cell size to extrusion direction cell size that is greater than one. At least one of these characteristics is missing in the examples of U.S. Pat. No. 7,919,538 and, as a result, the 25-year thermal conductivity value is higher than that of the foam of the present invention. Therefore, the presently claimed foam is able to achieve lower 25-year thermal conductivity values than foam prepared merely by introducing infrared attenuating agent into a polymer foam such as is taught in U.S. Pat. No. 7,919,538. Presumably, the lower thermal conductivity of the present invention is a result of specifically controlling cell size orientation and cell wall thickness as described herein.

TABLE 3

| | | U.S. Pat. No. 7,919,538 Example Numbers | | | | | | | | |
|---|---|---|---|---|---|---|---|---|---|---|
| Property | Units | Ex 1 | Ex 2 | Ex 5 | Ex 6 | Ex 7 | Ex 8 | Ex 9 | Ex 10 | Ex 11 |
| Formulation and Process Properties | | | | | | | | | | |
| Graphite Concentration | pph | 2 | 0 | 0.3 | 2 | 0 | 0 | 0.5 | 1.5 | 2 |
| Carbon Black Concentration | pph | 0 | 4 | 0 | 0 | 2 | 4 | 3 | 1 | 0 |
| Foaming Temperature | ° C. | 133 | 135 | 132 | 132 | 125 | 125 | 125 | 125 | 125 |
| Die Pressure | MP | 8.3 | 7.7 | 84 | 81 | 8.2 | 8.7 | 8.25 | 8.2 | 7.8 |
| Pressure Drop | MPa | 6.2 | 7.5 | 58 | 57 | 5.6 | 6.0 | 5.6 | 7.3 | 7.7 |
| Die Gate Height | mm | 0.96 | 1.54 | 0.85 | 0.82 | 1.00 | 1.05 | 1.00 | 1.47 | 1.62 |
| VBUR | — | 21.8 | 14.3 | 23.5 | 20.7 | 26.6 | 23.1 | 27.2 | 16.1 | 14.0 |
| EBUR | — | 0.48 | 0.84 | 0.59 | 0.58 | 0.47 | 0.51 | 0.43 | 0.68 | 0.76 |
| Foam Properties | | | | | | | | | | |
| Thickness | mm | 21 | 22 | 20 | 17 | 27 | 24 | 27 | 24 | 23 |
| Density | kg/m$^3$ | 31.2 | 29.2 | 27 | 29.9 | 32.4 | 34.1 | 34.9 | 36.7 | 37.9 |
| Percent open cells | % | 20 | 20 | 0.9 | 19 | 1.4 | 0.9 | 9.5 | 0.1 | 19.2 |
| Average Vertical Cell Size (z) | mm | 0.11 | 0.28 | 0.2 | 0.11 | 0.32 | 0.19 | 0.18 | 0.34 | 0.11 |
| Average Extrusion Cell Size (x) | mm | 0.06 | 0.24 | 0.15 | 0.11 | 0.2 | 0.11 | 0.08 | 0.21 | 0.09 |
| Average Horizontal Cell Size (y) | mm | 0.10 | 0.27 | 0.20 | 0.11 | 0.24 | 0.14 | 0.11 | 0.2 | 0.09 |
| z/x | — | 1.83 | 1.17 | 1.33 | 1.00 | 1.60 | 1.73 | 2.25 | 1.62 | 1.22 |
| Cell anisotropic ratio (k) | — | 1.26 | 1.07 | 1.10 | 1.00 | 1.29 | 1.33 | 1.54 | 1.40 | 1.14 |
| Vertical Compressive Strength | kPa | 400 | 261 | 354 | 382 | 538 | 531 | 554 | 482 | 493 |

TABLE 3-continued

| | | U.S. Pat. No. 7,919,538 Example Numbers | | | | | | | | |
|---|---|---|---|---|---|---|---|---|---|---|
| Property | Units | Ex 1 | Ex 2 | Ex 5 | Ex 6 | Ex 7 | Ex 8 | Ex 9 | Ex 10 | Ex 11 |
| Extrusion Compressive Strength | kPa | 119 | 164 | 110 | 123 | 148 | 170 | 134 | 197 | 305 |
| Horizontal Compressive Strength | kPa | 153 | 145 | 150 | 129 | 160 | 170 | 164 | 198 | 230 |
| Compressive Balance ($C_F$) | — | 2.94 | 1.69 | 2.72 | 3.03 | 3.49 | 3.12 | 3.72 | 2.44 | 1.84 |
| Gibson-Ashby $C_F$ | — | 3.07 | 1.36 | 1.58 | 1.00 | 3.36 | 3.91 | 8.05 | 5.05 | 1.90 |
| P-Ratio | — | 0.96 | 1.25 | 1.72 | 3.03 | 1.04 | 0.80 | 0.46 | 0.48 | 0.97 |
| 25-year thermal conductivity | W/m * K | 0.031 | 0.032 | 0.032 | 0.031 | 0.032 | 0.031 | 0.032 | 0.031 | 0.031 |

The invention claimed is:

1. An extruded polymer foam, the foam comprising a polymer matrix defining cells therein wherein the foam is characterized by:
    (a) the polymer matrix comprising styrene-acrylonitrile copolymer and 0.1 to 10 weight-percent infrared attenuator, based on foam weight, dispersed in the polymer matrix;
    (b) the cells having average sizes in the foam vertical, horizontal and extrusion directions, as determined by ASTM D-3576, such that
        i. the average size in the foam's vertical direction of 150 micrometers or less;
        ii. the ratio of average vertical direction cell size to average extrusion direction cell size that is greater than one; and
        iii. the cell anisotropic ratio that is greater than 1.1;
    (c) having a P-Ratio of 0.7 or less, with compressive strength values determined according to ASTM D1621;
    (d) having less than 0.2 moles of hydrocarbon blowing agents in the cells per kilogram of foam as determined by gas chromatography;
    (e) having a density of 20 to 48 kilograms per cubic meter as determined by ASTM D1622; and
    (f) having an average 25-year thermal conductivity that is 0.030 Watts per meter-Kelvin or less when free of fluorinated blowing agents and less than 0.028 Watts per meter-Kelvin when containing fluorinated blowing agent, with 25-year thermal conductivity as determined by the slicing technique of EN13164.

2. The extruded polymer foam of claim 1, further characterized by having an open cell content of less than 30 percent as determined by ASTM D6226-05.

3. The extruded polymer foam of claim 1, further characterized by having a vertical compressive strength that is greater than 200 kilopascals and a ratio of compressive strength in the vertical direction to the sum of compressive strengths in the vertical, horizontal and extrusion directions that is less than 0.45, where compressive strength is determined by ASTM D1621.

4. The extruded polymer foam of claim 1, further characterized by containing fluorinated blowing agent in the cells.

5. The extruded polymer foam of claim 1, further characterized by the polymer matrix comprising more than 90 weight-percent styrene-acrylonitrile copolymer based on total weight of polymer in the polymer matrix.

6. The extruded polymer foam of claim 1, where polymer foam is free of needle-like particles having a dimension that is 100 nanometers or smaller.

7. The extruded polymer foam of claim 1, further characterized by the polymer matrix comprising more than 90 weight-percent styrene-acrylonitrile copolymer based on total weight of polymer in the polymer matrix; the infrared attenuator is selected from a group consisting of carbon black and graphite, the P-Ratio of the foam being 0.60 or less, the cells containing fluorinated blowing agent and the 25-year thermal conductivity of the foam is 0.027 Watts per meter-Kelvin or less.

8. A process for preparing the extruded polymer foam of claim 1, the process comprising:
    (a) providing a foamable polymer mixture comprising styrene-acrylonitrile copolymer, 0.1 to 10 weight-percent infrared attenuator based on foamable polymer mixture weight and a blowing agent that contains less than 20 mole-percent hydrocarbon based on total moles of blowing agent and providing the foamable polymer mixture at an initial pressure that prevents expansion of the blowing agent;
    (b) extruding the foamable polymer mixture through a die at a die pressure that is greater than six megapascals and at a foaming temperature in a range of 110 to 135 degrees Celsius into a region of pressure below the initial pressure; and
    (c) allowing the foamable polymer mixture to expand into a polymer foam while controlling the expansion of the foamable polymer mixture so that the expansion achieve a vertical blow up ratio in a range of 4-12 and an extrusion blow up ratio in a range of 1-2.

9. The process of claim 8, further characterized by the blowing agent comprising a fluorinated blowing agent, less than 20 mole-percent hydrocarbon and greater than 15 mole-percent water with mole-percent based on total moles of blowing agent.

10. The process of claim 8, further characterized by the foamable polymer mixture comprising greater than 90 weight-percent styrene-acrylonitrile copolymer based on total weight of polymer in the foamable polymer mixture.

* * * * *